(12) United States Patent
Jung

(10) Patent No.: US 12,240,609 B2
(45) Date of Patent: Mar. 4, 2025

(54) CASCADING PRIVACY DIVIDER

(71) Applicant: B/E Aerospace, Inc., Winston-Salem, NC (US)

(72) Inventor: Sung Eun Jung, Winston Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 370 days.

(21) Appl. No.: 17/862,595

(22) Filed: Jul. 12, 2022

(65) Prior Publication Data

US 2024/0017832 A1 Jan. 18, 2024

(51) Int. Cl.
*B64D 11/06* (2006.01)

(52) U.S. Cl.
CPC .............. *B64D 11/0606* (2014.12)

(58) Field of Classification Search
CPC .......... E06B 3/921; E06B 3/925; E06B 3/927; E06B 9/0607; E06B 9/0646; E06B 9/0676; B64D 11/06; B64D 11/0604; B64D 11/0606; B64D 11/0641
See application file for complete search history.

(56) References Cited

U.S. PATENT DOCUMENTS

| | | | |
|---|---|---|---|
| 1,238,704 A | | 8/1917 | Wendelken |
| 1,628,511 A | * | 5/1927 | Petersen ................ E06B 3/927 160/32 |
| 2,707,311 A | * | 5/1955 | Orlin ........................ E06B 3/50 49/165 |
| 3,955,239 A | | 5/1976 | Grossman |
| 4,180,942 A | * | 1/1980 | Saucier ..................... E06B 3/28 49/419 |
| 5,918,422 A | | 7/1999 | Bucher, Jr. |
| 10,508,452 B2 | | 12/2019 | Hooper |
| 10,946,966 B2 | | 3/2021 | Frost et al. |
| 11,225,327 B2 | * | 1/2022 | Perera ................ B64D 11/0606 |
| 11,584,530 B2 | * | 2/2023 | Kodati ................ B64D 11/0606 |
| 11,827,360 B2 | * | 11/2023 | Satterfield .......... B64D 11/0638 |

(Continued)

FOREIGN PATENT DOCUMENTS

| | | |
|---|---|---|
| EP | 2775058 B1 | 7/2015 |
| EP | 3552966 A1 | 10/2019 |

(Continued)

OTHER PUBLICATIONS

Extended European Search Report dated Dec. 5, 2023; European Application No. 23184620.5.

*Primary Examiner* — Abe Massad
*Assistant Examiner* — John W Hanes, Jr.
(74) *Attorney, Agent, or Firm* — Suiter Swantz IP

(57) ABSTRACT

A multi-panel system includes a drive panel coupled to an actuator and a follower panel coupled to the drive panel via a first latch rotatably coupled to the follower panel. The drive panel and the follower panel translate along a guide rail configured with a latch keeper at a latch position. The drive panel and follower panel are initially stored substantially superposed to each other. Upon translating the drive panel toward a final position, the first latch is configured to couple the first follower panel to the drive panel when the drive panel is translated from the stored position, and 1) couple to the first latch keeper, and 2) uncouple the first follower panel from the drive panel when the first follower panel has translated to the first latch position.

20 Claims, 13 Drawing Sheets

(56) References Cited

U.S. PATENT DOCUMENTS

| | | | |
|---|---|---|---|
| 11,866,981 B2* | 1/2024 | McGreevy | E05F 15/643 |
| 11,905,020 B2* | 2/2024 | Scotford | B64D 11/0606 |
| 2016/0130865 A1* | 5/2016 | De Muelenaere | E06B 9/0638 |
| | | | 160/113 |
| 2016/0281412 A1* | 9/2016 | Leitmann | E05F 17/00 |
| 2016/0340041 A1* | 11/2016 | Peuziat | B64D 11/06 |
| 2019/0316399 A1* | 10/2019 | Sauve | E05F 15/681 |
| 2020/0011102 A1* | 1/2020 | Narvaez | E06B 3/5072 |
| 2020/0262562 A1 | 8/2020 | Dowty et al. | |
| 2020/0277059 A1* | 9/2020 | Ng | B64D 11/064 |
| 2021/0032856 A1* | 2/2021 | Hall | E04B 2/827 |
| 2021/0221516 A1 | 7/2021 | Bonnefoy et al. | |
| 2022/0135230 A1* | 5/2022 | Satterfield | B64D 11/0606 |
| | | | 108/44 |
| 2022/0258866 A1* | 8/2022 | Wills | B64D 11/0601 |
| 2022/0402612 A1* | 12/2022 | Davis | B64D 11/0602 |
| 2023/0356846 A1* | 11/2023 | Scotford | B64D 11/0606 |
| 2024/0076041 A1* | 3/2024 | Woodington | B64D 11/0606 |

FOREIGN PATENT DOCUMENTS

| | | |
|---|---|---|
| EP | 3542007 B1 | 4/2020 |
| KR | 200196523 Y1 | 9/2000 |
| WO | 2021069886 A1 | 4/2021 |
| WO | 2022029105 A1 | 2/2022 |

* cited by examiner

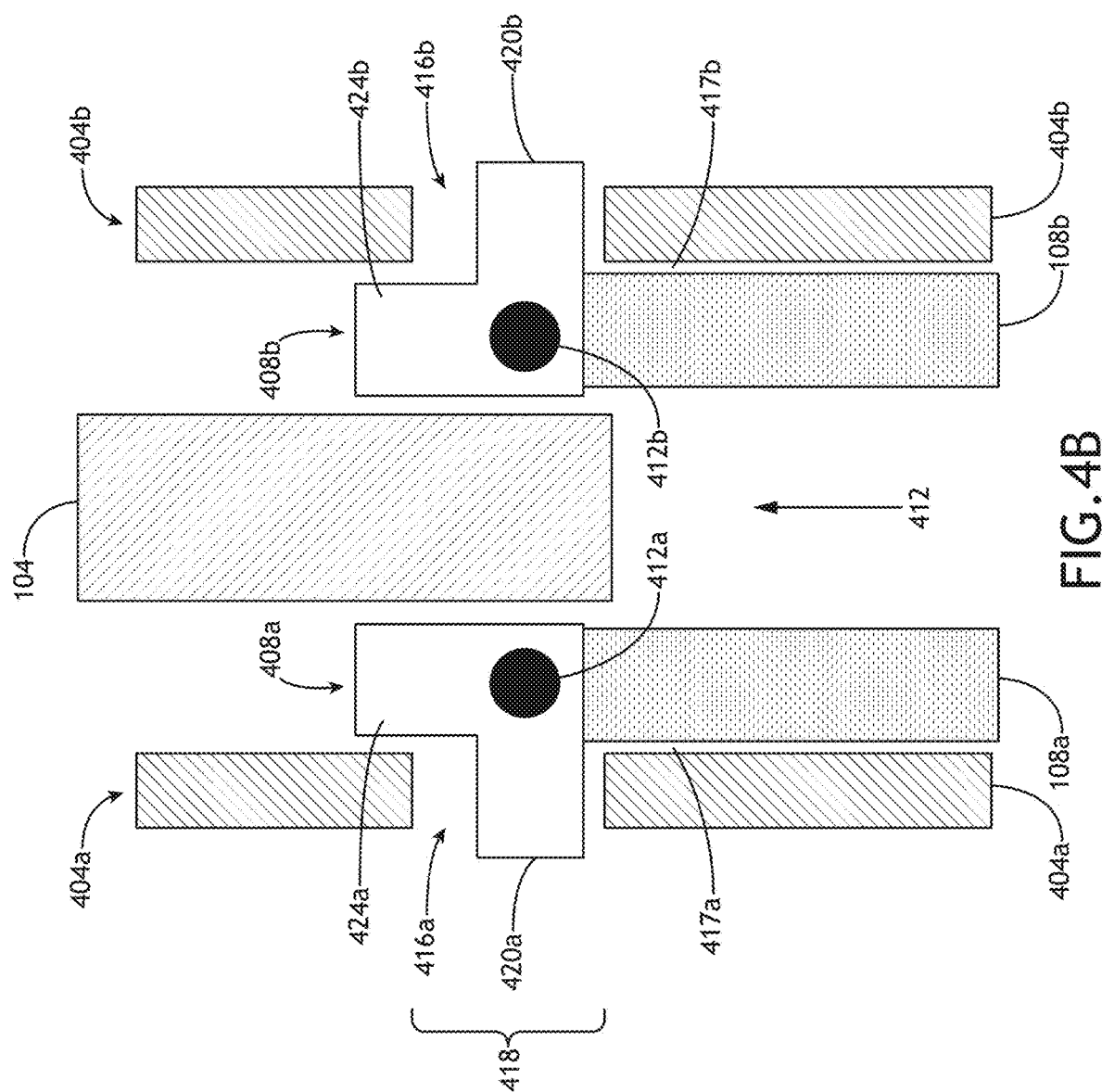

CASCADING PRIVACY DIVIDER

BACKGROUND

Vehicle passengers often prefer different levels of privacy during travel. For example, a single traveler may want to have increased privacy when sleeping in a passenger seat than when awake. Privacy dividers help in maintaining a sense of privacy for the traveling passenger. However, privacy dividers may be permanently fixed, or lack easy adjustments, preventing the passenger from having control over their privacy preferences. Accordingly, it is desirable to provide a privacy screen having increased flexibility or operability for adjusting a privacy level than conventional approaches.

SUMMARY

A multi-panel system is disclosed. In one or more embodiments, the multi-panel system includes a guide rail. In one or more embodiments, the guide rail includes a guide channel formed along a length of the guide rail. In one or more embodiments, the guide rail further includes a rail wall that includes a first latch keeper. In one or more embodiments, the multi-panel system further includes a drive panel configured to translate along the guide rail from a stored position to a final position. In one or more embodiments, the drive panel further includes a drive panel portion disposed on a first configured to fit within the guide channel and an actuation point configured to couple to an actuator. In one or more embodiments. In one or more embodiments, the multi-panel system further includes a first follower panel configured to translate along the guide rail and further configured to translate from the stored position, substantially superposed relative to the drive panel, to a first latch position. In one or more embodiments, the first follower panel includes a first panel surface and a first latch rotatably coupled to the first panel surface configured to couple the first follower panel to the drive panel when the drive panel is translated from the stored position. In one or more embodiments, the first latch is further configured to couple to the first latch keeper when the first follower panel has translated to the first latch position. In one or more embodiments, the first latch is further configured to uncouple the first follower panel from the drive panel when the first follower panel has translated to the first latch position. In one or more embodiments, upon translation of the drive panel to the final position, the first follower panel remains in the first latch position and is disposed inferior and parallel to the drive panel.

In some embodiments of the multi-panel system, the multi-panel system includes a second latch keeper disposed inferior to the first latch keeper along the rail wall and a second follower panel configured to translate along the guide rail and further configured to translate from the stored position, substantially superposed relative to the first follower panel, to a second latch position. In some embodiments of the multi-panel system, the second follower panel includes a second follower portion configured to fit within the guide channel and a second latch coupled to the second follower portion. In some embodiments, the second latch is configured to couple the second follower panel to the first follower panel when the drive panel is translated from the stored position. In some embodiments, the second latch is further configured to couple to the second latch keeper when the second follower panel has translated to the second latch position. In some embodiments, the second latch is further configured to uncouple the second follower panel from the first follower panel when the second follower panel has translated to the second latch position. In some embodiments of the multi-panel system, upon translation of the first follower panel to the first latch position, the second follower panel remains in the second latch position and is disposed inferior and parallel to the first follower panel.

In some embodiments of the multi-panel system, the multi-panel system further includes a second guide rail configured to interact with the drive panel on a second end opposite the first end.

In some embodiments of the multi-panel system, the first latch is configured as a cam latch comprising a first cam configured to rotate into the first latch keeper via a cam bearing.

In some embodiments of the multi-panel system, the first cam includes a first roller configured to roll against the rail wall while the first follower panel translates from the stored position toward the first latch position.

In some embodiments of the multi-panel system, the first latch further comprises a second cam that includes a second roller, wherein the second cam prevents the drive panel from translating past the first follower panel when the drive panel translate from the stored position toward the first latch position, wherein the second roller assists the translation of the drive panel from the first latch position to the final position.

In some embodiments of the multi-panel system, the multi-panel system further includes the actuator.

In some embodiments of the multi-panel system, the actuator is configured as a linear screw actuator.

In some embodiments of the multi-panel system, the multi-panel system further includes a controller operatively coupled to the actuator, wherein the controller is configured to control the actuator via input from a first user interface.

In some embodiments of the multi-panel system, the multi-panel system further includes a second user interface, wherein the second user interface is configured to override a function of the first user interface.

In some embodiments of the multi-panel system, the multi-panel system further includes a pair of the guide rails, and a pair of first follower panels, wherein a translation of the drive panel from the stored position to the final position causes an equivalent translation between the pair of the first follower panels.

In some embodiments of the multi-panel system, upon a translation of the drive panel translating to the final position, the drive panel and the first follower panel are further coupled via a dovetail joint.

In some embodiments of the multi-panel system, translating the drive panel to the final position forms a privacy screen.

In some embodiments of the multi-panel system the privacy screen is implemented between two seats.

In some embodiments of the multi-panel system, the multi-panel system further includes the two seats.

In some embodiments of the multi-panel system, a top of the drive panel is disposed at or below the surface of at least one seat pan of the two seats when the drive panel is configured in the stored position.

In some embodiments of the multi-panel system the two seats are configured to recline to a flat position.

In some embodiments of the multi-panel system, the multi-panel system further includes an armrest coupled to at least one of the drive panel or the first follower panel.

In some embodiments of the multi-panel system, the multi-panel system further includes an armrest coupled to at least one of the drive panel, the first follower panel, or the second follower panel.

In some embodiments of the multi-panel system, the multi-panel system is further implemented on-board an aircraft.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 4A-B are drawings illustrating a side-on view of a portion of the multi-panel system, in accordance with one or more embodiments of the disclosure;

DETAILED DESCRIPTION

Figure 1A:
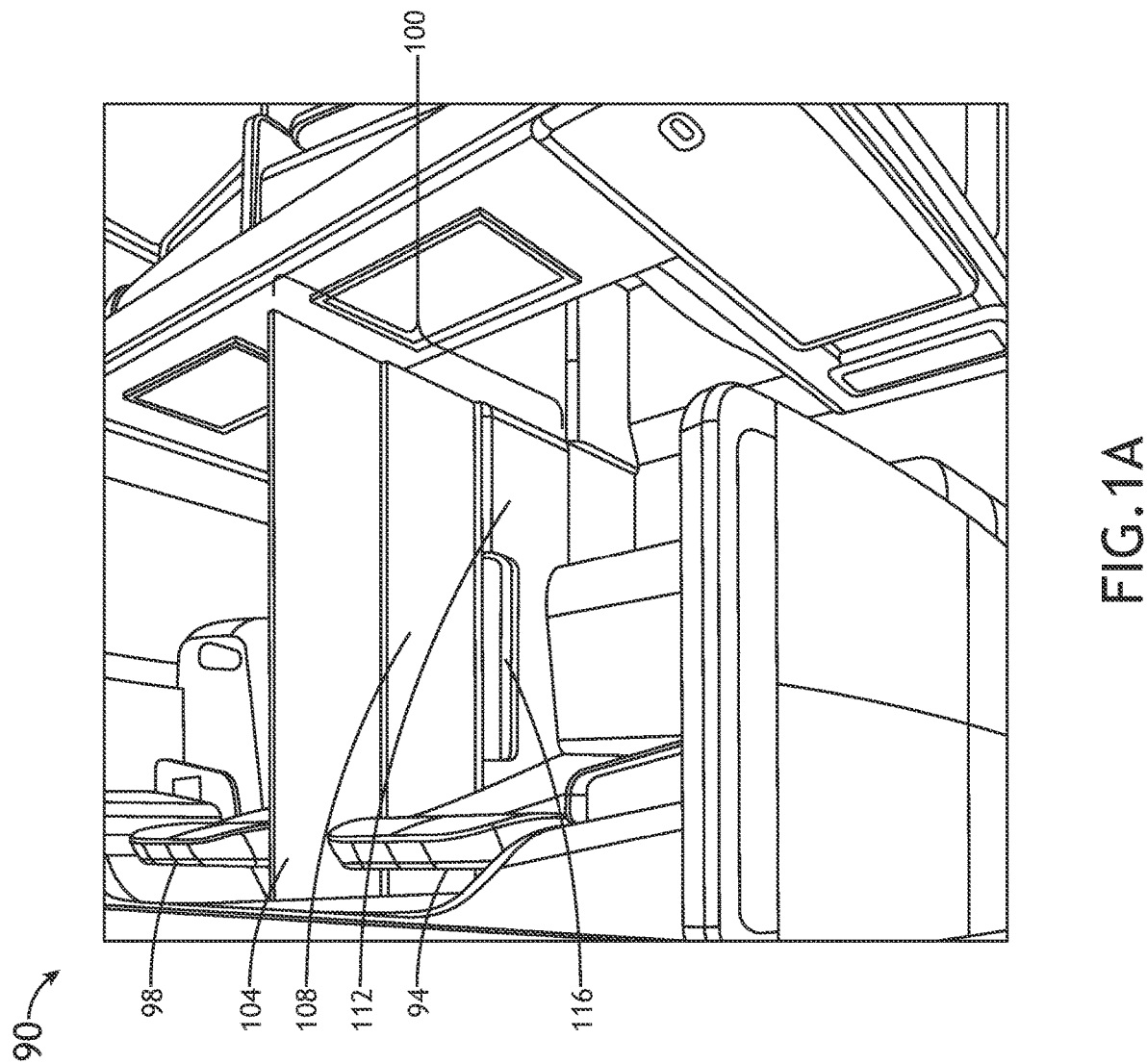
FIG. 1A is a drawing illustrating a perspective view of a seating with an extended privacy screen, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1 b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A multi-panel system is disclosed. The multi-panel system includes a driver panel and one or more follower panels that are mechanically linked to a guide rail. The drive panel is operatively coupled to an actuator system that raises/lowers the driver panel between a stored position and a final/peak position. The one or more follower panels are sequentially coupled to each other and the driver panel, and are stored flat, or superposed, with the driver panel in the stored position. When the drive panel is raised to the final position, the one or more follower panels translate relative to the other panels so that a combined flat panel surface, such as a privacy screen surface, is created. The coordination of the translation of the panels is controlled by a latch disposed upon each panel that latches onto a latch keeper positioned within a rail wall of the guide rail. The activator system may include a screw-type linear actuator.

FIG. 1A illustrates a perspective view of a seating scheme 90 in accordance with one or more embodiments of the disclosure. The seating scheme 90 may include any type of seating including but not limited to passenger seating, stadium seating, and restaurant seating. For example, the seating scheme 90 may include an aircraft seating arrangement (e.g., the multi-panel system 100 is on-board an aircraft. The seating scheme may include a first seat 94 a second seat 98, and a collapsible multi-panel system 100 that forms a privacy screen when fully extended.

In embodiments, the multi-panel system 100 includes a drive panel 104 and a first follower panel 108 having a first panel surface 110 that is positioned immediately inferior to the drive panel 104 when the multi-panel system 100 is fully extended. The multi-panel system 100 may include any number of follower panels 108. For example, the multi-panel system 100 may include a second follower panel 112 that is positioned immediately inferior to the first follower panel 108 when the multi-panel system is fully extended. In this manner, the multi-panel system may be configured to include a third follower panel, a fourth follower panel, and so on. The multi-panel system 100 may also include an armrest 116.

Figure 1B:
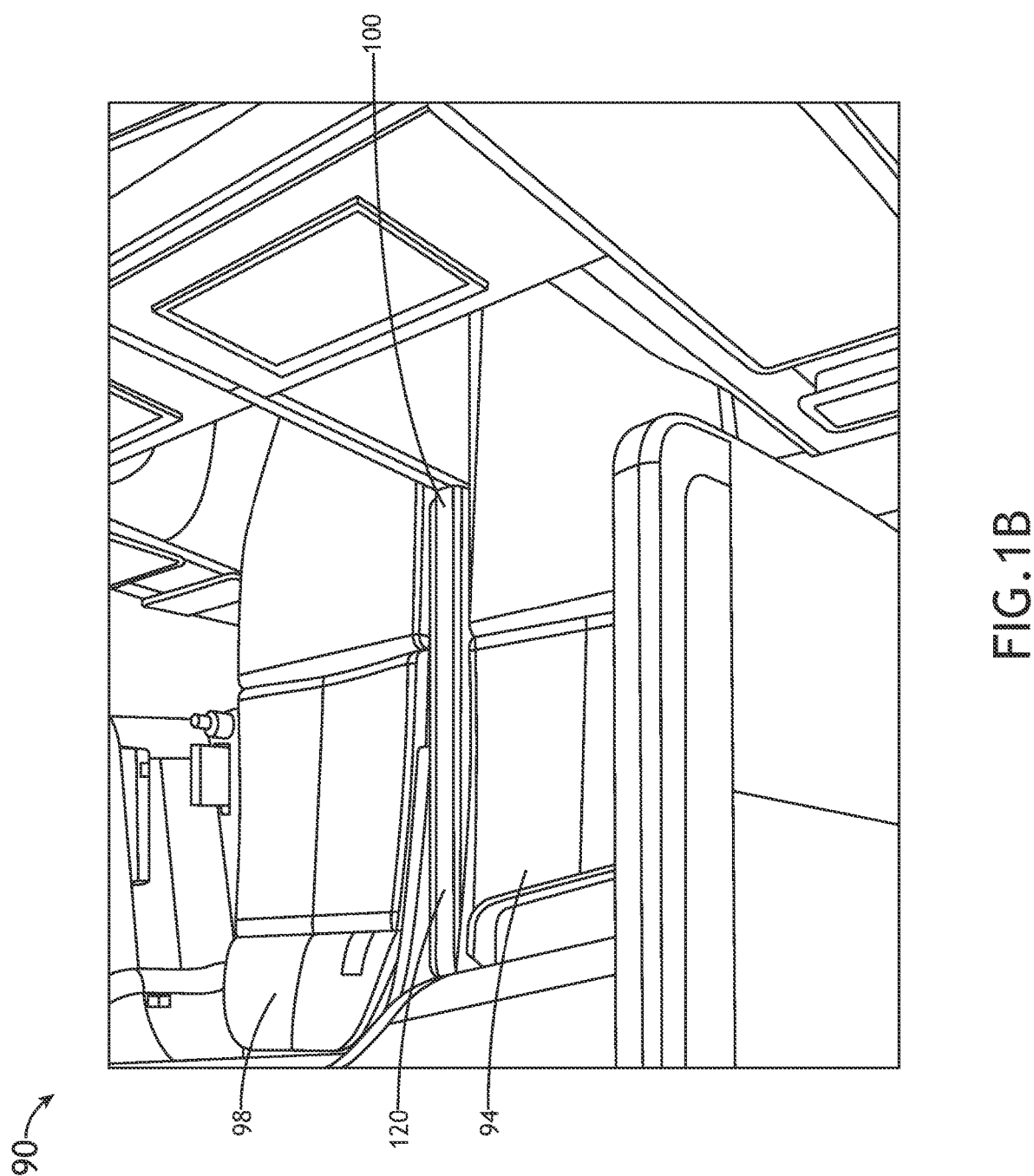
FIG. 1B is a drawing illustrating a perspective view of a seating scheme with the seats reclined in bed mode and the privacy screen in a stored position, in accordance with one or more embodiments of the disclosure.

In embodiments, multi-panel system 100 transitions from a fully extended, or final, position (e.g., as shown in FIG. 1A), to a stored position, as shown in FIG. 1B, in accordance with one or more embodiments of the disclosure. To transition to the stored position, the drive panel 104, the first follower panel 108, and the second follower panel 112 collapse into a base 12 of the multi-panel system, by sliding downward into the base, the drive panel 104, the first follower panel 108, and the second follower panel 112 being stored in a superposed orientation to each other within the base 120. The collapsing of the multi-panel system into the stored position permits barrier-free interaction between the passengers using the first seat 94 and the second seat. The first seat 94 and the second seat may further be reclined into a flat "bed mode' position, providing a single large flat area that can be used for a shared sleeping arrangement, as shown in FIG. 1B.

It should be understood that the multi-panel system 100 may be extendable in any orientation. For example, the multi-panel system 100 may extend upward from a stored position, as shown in FIG. 1A. In another example, the multi-panel system 100 may extend downward, such as from the ceiling. In another example, the multi-panel system may extend horizontally from a base 120. Therefore, the above description should not be interpreted as a limitation of the present disclosure, but merely as an illustration.

Figure 1C:
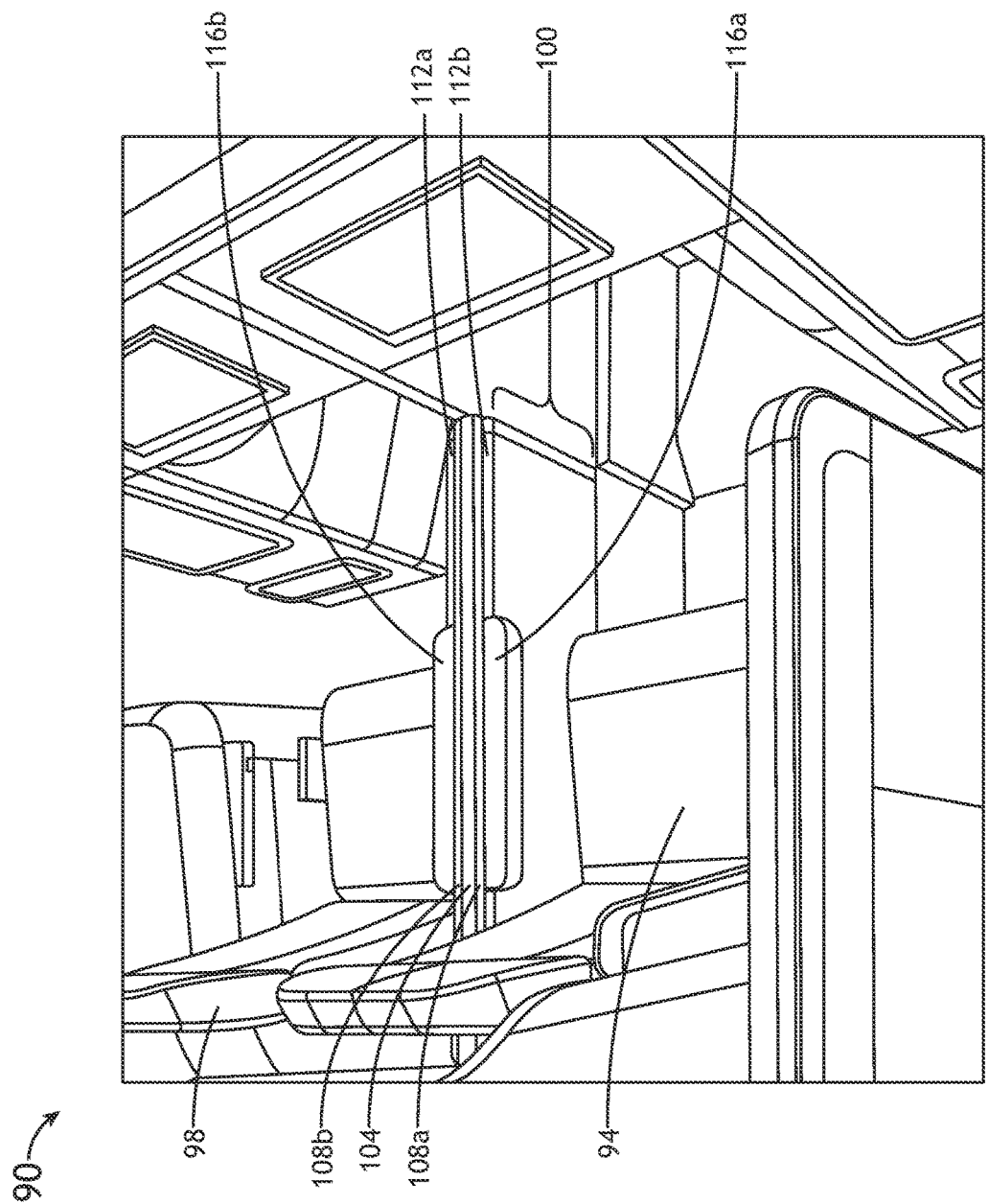
FIG. 1C is a drawing illustrating a perspective view of a seating scheme with the privacy screen raised to an intermediate position, in accordance with one or more embodiments of the disclosure.

In embodiments, the multi-panel system 100 may extend to a position between the stored position and the final position (e.g., one or more intermediate positions), such as a taxi, takeoff, and landing (TTL) position, as shown in FIG. 1C, in accordance with one or more embodiments of the disclosure. In the TTL position, the drive panel 104 and the first follower panel 108a collapse to the same height as the second follower panel 112a. The armrest 116a is coupled to second follower panel 112a, enabling the passenger to use the armrest 116a during taxi, takeoff, or landing.

In embodiments, the multi-panel system 100 may have a symmetrical arrangement, having one pair of first follower panels 108a-b and one pair of second follower panels 112a-b, with each first follower panel 108a-b and each second follower panel 112a-b facing a respective seat 94, 98. In this symmetrical arrangement, the multi-panel system 100 may include a single drive panel 104 (e.g., as shown in FIG. 1C, or a pair of drive panels 104. For example, the translation of the drive panel from the stored position to the final position may cause an equivalent translation between the pair of the first follower panels 108a-b (e.g., both first follower panels 108a-b are translated the same distance). The translation of the drive panel 104, the first follower panel 108, and the second follower panel 112 may be powered and/or controlled manually (e.g., via the passenger or a flight attendant) or by an actuating device, such as an electrical motor.

Figure 2A:
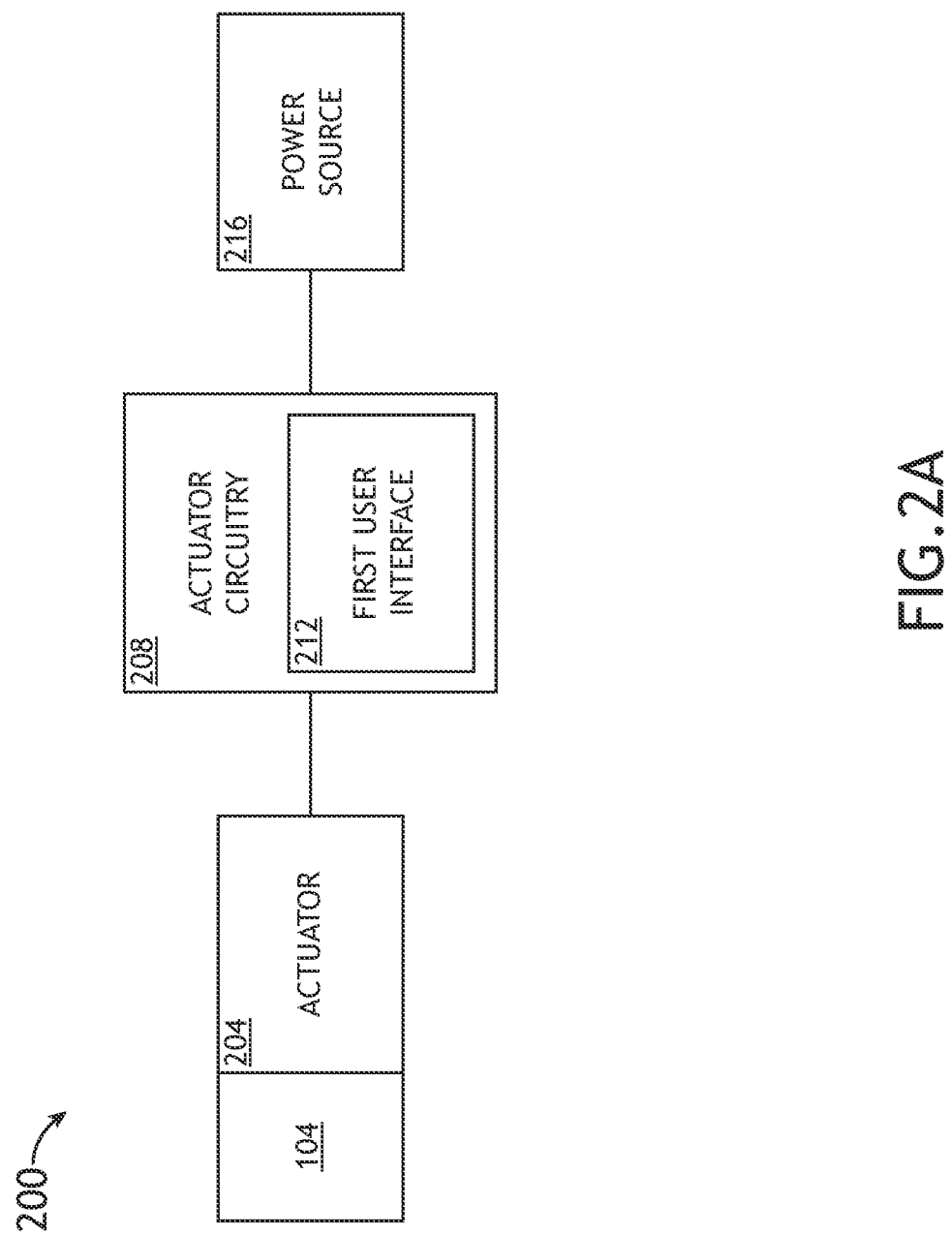
FIGS. 2A-B are block diagrams illustrating electrical schemes for operating the multi-panel system, in accordance with one or more embodiments of the disclosure.
Figure 2B:
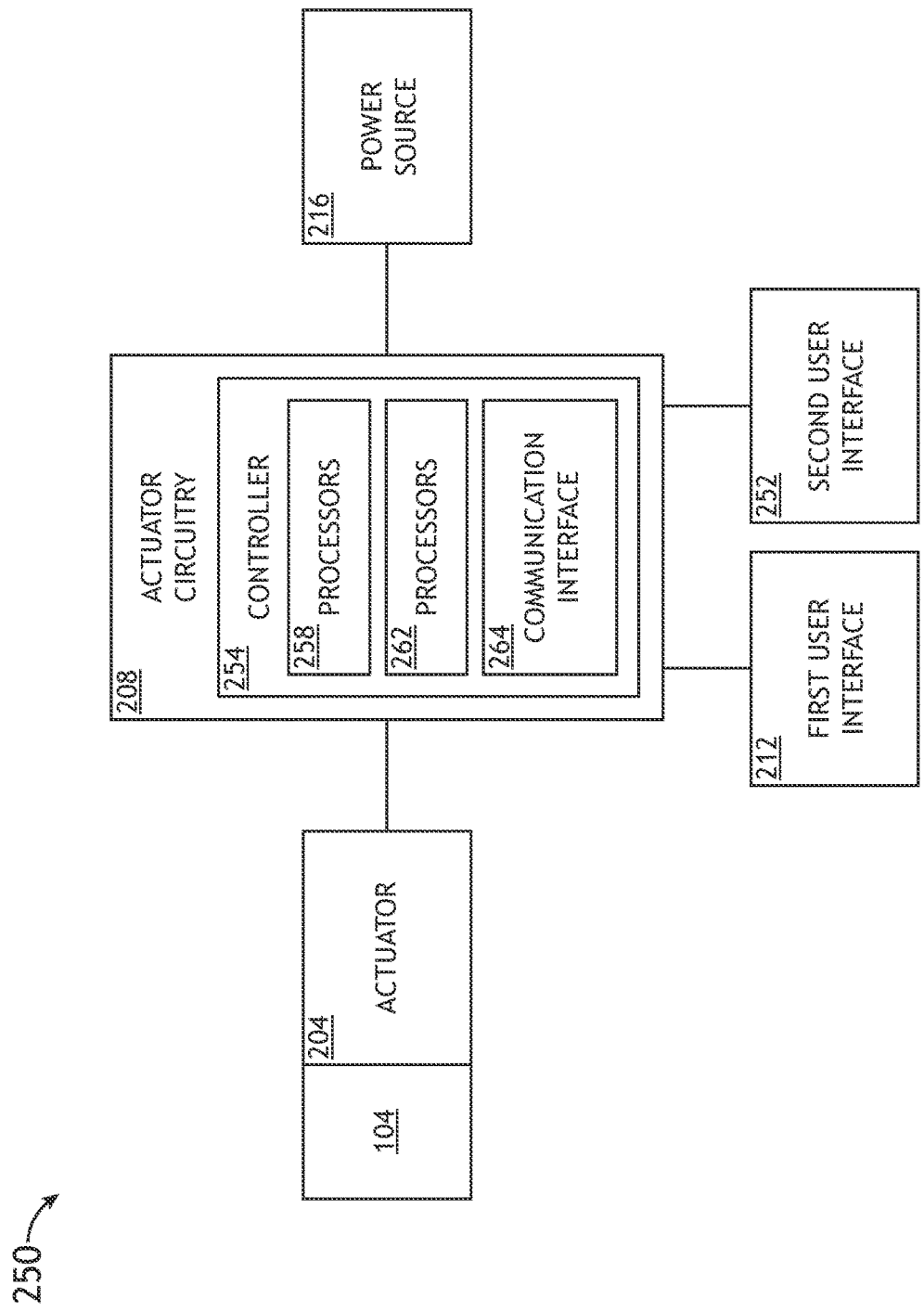

FIGS. 2A-B are block diagrams illustrating electrical schemes 200, 250 for operating the multi-panel system 100, in accordance with one or more embodiments of the disclosure. FIG. 2A demonstrates a simple electrical scheme 200 where an actuator 204, mechanically/operatively coupled to the driver panel 104, is controlled by actuator circuitry 208. The actuator circuitry 208 is connected to a power source 216 (e.g., a battery and/or electrical outlet), and may include electrical componentry for operating the actuator 204, such as an electrical switch. The actuator circuitry 208 may further include a first user interface 212, such as a power button or switch, that can receive input from a passenger or attendant.

FIG. 2B demonstrates a more complex electrical scheme 250, wherein the actuator circuitry 208 further includes a second user interface 252, and a controller 254 comprising one or more processors 258, memory, 262, and a communication interface 264. The first user interface 212 and second user interface 252 may be operatively coupled to the actuator circuitry via wireless and/or wireline methods. For example, the first user interface 212 may communicate with the actuator circuitry via a Bluetooth signal.

The one or more processors 258 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), one or more digital signal processors (DSPs), or a state device). In this sense, the one or more processors 258 may include any device configured to execute algorithms and/or instructions (e.g., program instructions stored in memory 262).

The memory 262 may include any stored medium known in the art suitable for storing the one or more sets of program instructions executable by the associated one or more processors 258. For example, the memory 262 may include a non-transitory memory medium. For instance, the memory 148 may include, but is not limited to, a read-only memory (ROM), a random-access memory (RAM), a magnetic or optical memory device (e.g., disk), a magnetic tape, a solid-state drive, and the like. The memory 262 may be configured to provide information to the controller 254, or other components of the multi-panel system 100. In addition, the memory 262 may be configured to store user input. The memory 262 may be housed in a common controller housing with the one or more processors 258. The memory 262 may, alternatively or in addition, be located remotely with respect to the spatial location of the processors 258, or the controller 254. For example, the one or more processors 258 and/or the controller 254 may access a remote memory 262 accessible through a network (e.g., wireless, and the like) via one or more communication interfaces 264.

The one or more communication interfaces 264 may be operatively configured to communicate with components of the controller 254 or any other componentry within the multi-panel system 100. For example, the one or more communication interfaces 264 may be configured to retrieve data from the one or more processors 258 or other devices, transmit data for stored in the memory 262, retrieve data from stored in the memory 262, and so forth. The one or more communication interfaces 264 may also be communicatively coupled with the one or more processors 258 to facilitate data transfer between components of the controller 254, and the multi-panel system 100. It should be noted that while the one or more communication interfaces 264 are described as a component of the controller 254, one or more components of the one or more communication interfaces 264 may be implemented as external components communicatively coupled to the controller 254 via a wired and/or wireless connection.

In some embodiments, the multi-panel system 100 include separate user interfaces (e.g., a first user interface 212 and a second user interface 252) or a first user interface 212 with different functionality dependent upon who is operating the multi-panel system 100. For example, in embodiments, the attendant has privileges to operate the multi-panel system 100 to translate between bed mode and TTL mode, whereas the passenger does not have privileges to operate the multi-panel system 100 to translate between bed mode and TTL mode. For instance, to ensure that only the attended is capable of operating the multi-panel system 100 to translate between bed mode and TTL mode, the first user interface 212 may include an override function (e.g., activated by a password or other authentication or credential) that allow the attended to perform the translation. In another instance, the passenger may control the actuator 204 in a limited fashion via a first user interface 212 physically located on or near the multi-panel system 100, whereas the attendant may control the actuator 204 in the second user interface 252 having override functions that the passenger does not have access to (e.g., via a hidden switch, or wirelessly through an app on a mobile device.

Figure 3A:
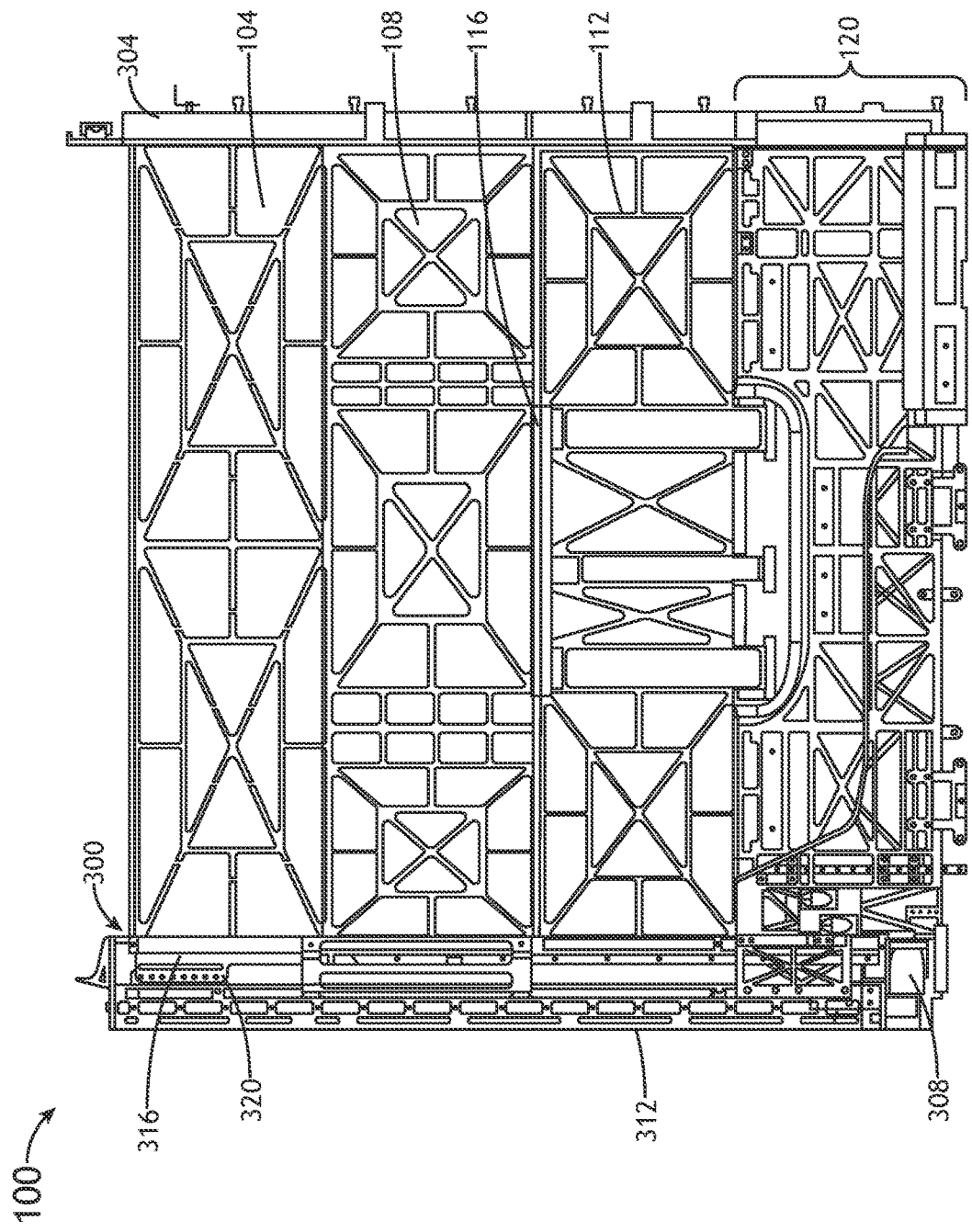
FIGS. 3A-C are drawings of a front view of the multi-panel system 100 in a final position, intermediate position, and stored position, respectively, in accordance with one or more embodiments of the disclosure.

FIG. 3a is a drawing illustrating a front view of the multi-panel system 100, in accordance with one or more embodiments of the disclosure. In embodiments, the multi-panel system further includes a first guide rail 300 that mechanically couples to the drive panel 104, the first follower panel 108 and the second follower panel 112, and guides the drive panel 104, the first follower panel 108 and the second follower panel 112 between the final position (e.g., as shown in FIG. 3A) to the stored position, where all three panels are disposed in the base 120.

In embodiments, the multi-panel system 100 further includes a second guide rail 304. For example, the first guide rail 300 may be configured to attach at a first end of the drive panel 104, and the second guide rail 304 may be configured to attach at a second end (e.g., an opposite end) of the drive panel). The second guide rail adds stability to the multi-panel system.

In embodiments, the multi-panel system further includes an actuator energy device 308 and an actuator control device 312. (e.g., the actuator 204 comprising the actuator energy device 308 and the actuator control device 312). The actuator control device 312 is controlled by the actuator energy device 308. For example, the actuator 204 may be configured as a linear actuator, wherein the actuator control device is configured as a central screw, and the actuator energy device 308 is configured as an electric motor, with the electric motor operating the screw to raise and lower the drive panel 104. Other type of actuators 204 may be used including but not limited to hydraulic actuators, pneumatic actuators, linear motors, and the like. For example, the actuator 204 may comprise a pulley system operated by an electric motor.

In embodiments, the actuator 204 is configured to mechanically couple to the drive panel 104 at an actuation point 316 (e.g., via a connector 320). For example, a nut of a screw-type linear actuator may be operatively coupled to the drive panel 104 panel at the actuation point 316 so that when a main screw of the linear actuator is turned, the position of the drive panel 104 changes in a coordinated fashion. Because the first follower panel 108 is coupled to the driver panel 104, and the second follower panel 112 is coupled to the first follower panel 108, all panels move in a coordinated fashion with the drive panel.

Figure 3B:
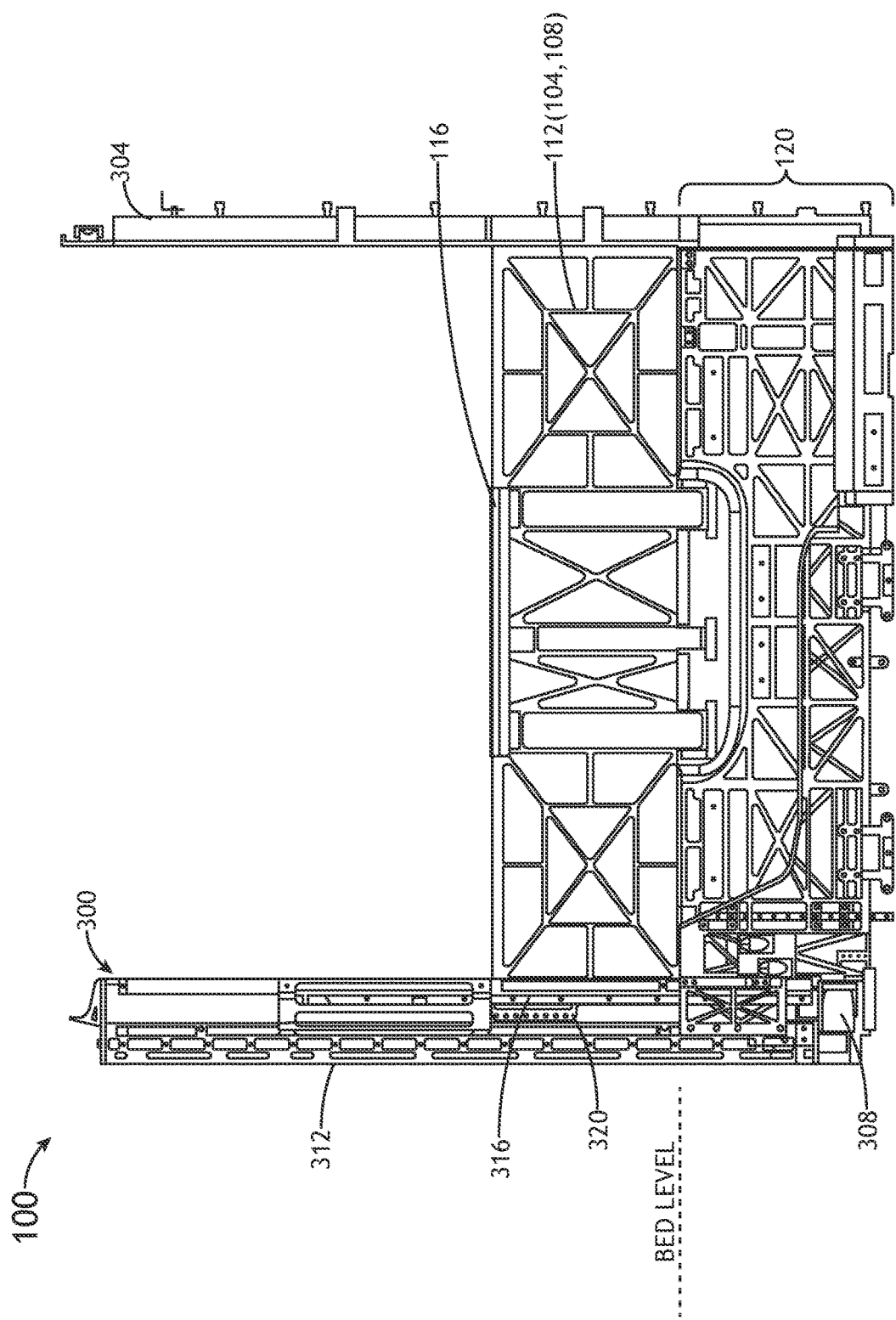
Figure 3C:
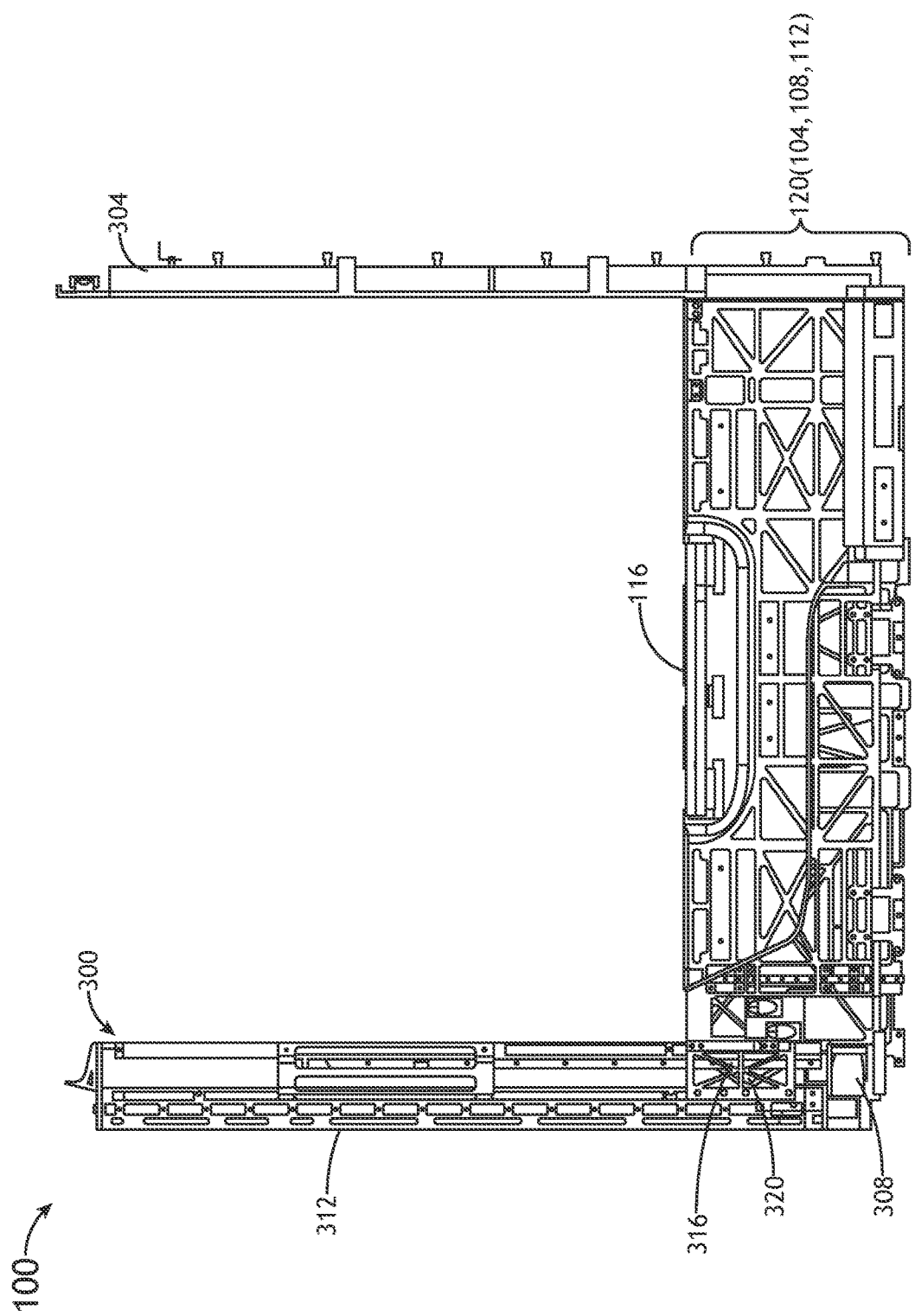

Upon translation to one of the intermediate positions, the drive panel 104 and the first follower panel 104 are lowered by the action of the actuator 104 via the connector 320 to a height equal, or near equal, to the second follower panel 112, as shown in FIG. 3B. Further lowering of the connector 320 results in the translation of the drive panel 104, the first follower panel 108, and the second follower panel 112 into the base 120 (e.g., the stored position or bed mode).

Figure 4A:
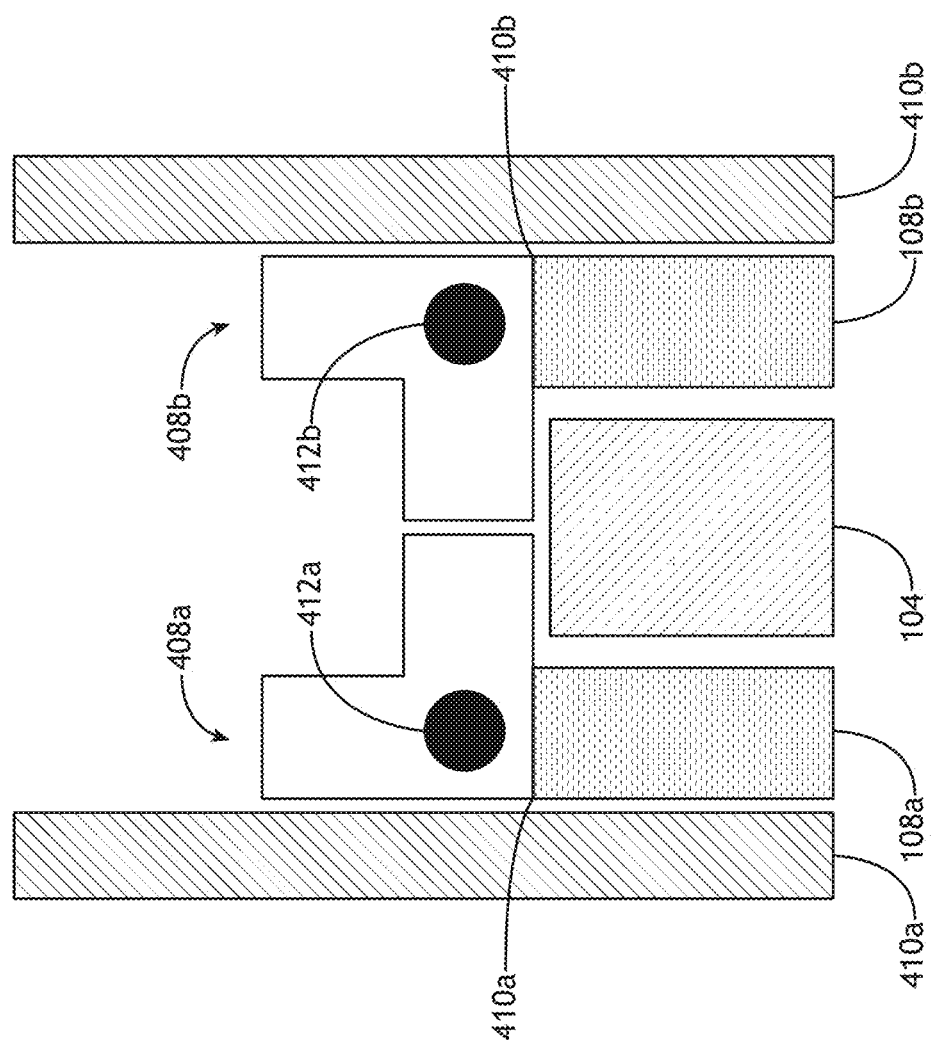

FIGS. 4A-B are drawings illustrating a side-on view of a portion of the multi-panel system 100, in accordance with the one or more embodiments of the disclosure. As shown in FIG. 4A, the drive panel 104 is positioned adjacent to a pair of first follower panels 108a-b, which are themselves positioned adjacent to a pair of rail walls 404a-b. Operatively coupled to the pair of first follower panels 108a-b are latches 408a-b (e.g., rotatably coupled to the first follower panels 108a-b at a first surface 410a-b) that rotate along a bearing 412a-b.

when the drive panel 104 is moved upward/forward (e.g., in the direction of the latches 408a-b), the latches 408a-b are unable to rotate, keeping the drive panel 104 and the one or more first follower panels 108a-b coupled together. When the drive panel 104 is lowered, the latches are still unable rotate, and the first follower panel 108a-b translates along with the drive panel 104. For example, the gravity forces keep the first follower panels 108a-b aligned/superposed with the drive panel 104 due to the latches 408a-b being suspended on the drive panel 104. The continuous stretches of the rail walls 404a-b preventing the latches 408a-b from rotating.

Upon an upward movement 412 of the drive panel 104, the first follower panels 108a-b are also pushed upward due to the drive panel 104 pushing the latches 408a-b upward towards a latching position, as shown in FIG. 4B. In embodiments, the guide rails 300, 304 include one or more latch keepers 416a-b integrated into a first rail wall surface 417a-b at a first latch position 418 that effectively secures the latches 408a-b. The latch keepers 416a-b may be configured as any type of latch securing structure. For example, the latch keepers may be configured as a hole or aperture within the guide rails 300, 304 that allow the latches 408a-b to rotate. As the latches 408a-b rotate, a first cam 420a-b enters the latch keeper 416a-b, holding the first follower panel into place. A second cam 424a-b located on the latch 408a-b that originally prevented the drive panel 104 from translating past the first follower panel 108a-b, as shown in FIG. 4A, is rotated out of the way of the drive panel 104, uncoupling the first follower panel 108a-b from the drive panel 104, allowing the drive panel 104 to translate upward without the first follower panels 108a-b, which remain immobilized at the first latch position (e.g., forces between the latch 408a-b and the drive panel 104 keep the first follower panel 108a-b secured). When the drive panel 104 translates to the final position, the first follower panel 108a-b may remain at the first latch position, disposed inferior and parallel to the drive panel 104.

To unlatch the latches 408a-b from the first latch position, the drive panel 104 is lowered, to a position equal, or near equal to the first follower panels 108a-b, such as the relative position of the drive panel 104 to the first follower panels 108*a-b* as shown in FIG. 4A. At that point, the latches 408l-*b* rotate, removing the first cam 420*a-b* from the latch keeper 416*a-b*.

The latching scheme of the allows any number panels to be implemented within the multi-panel system 100 panel-specific latches 408*a-c* and latch keepers 416*a-b* that are operatively coupled via the latches to a singular drive panel 104 that is translated via the actuator 204. For example, for the multi-panel system 100 that includes two panels, the multi-panel system 100 would include a driver panel 104 coupled to the first follower panel 108*a-b* by a first latch 408*a-b*, that when translated from the stored position (e.g., both panels stored in the base 120) for the final position, the first latch 408*a-b* rotates the first cam 420*a-b* into the first latch keeper 416*a-b* at the first latch position 418. The drive panel 104 may then be driven further by the actuator to the final position (e.g., full extension).

Figure 4C:
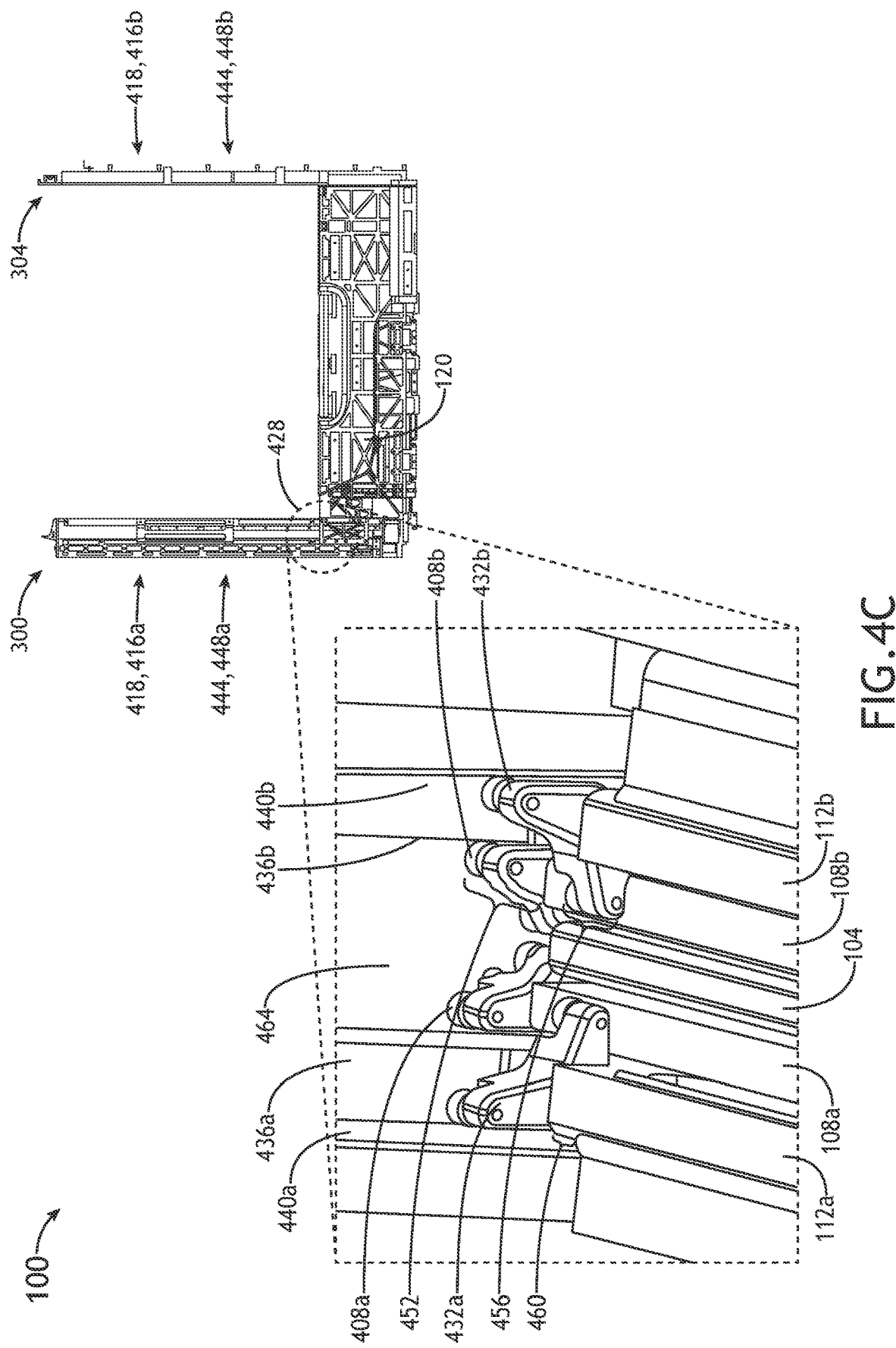
FIG. 4C is a drawing illustrating a front view of the multi-panel system 100 an inset showing detail of the multi-panel system in the stored position, in accordance with one or more embodiments of the disclosure.

FIG. 4C illustrates, the multi-panel system 100 with three panels in the stored position, with all three panels dispose in the base 120. FIG. 4C further includes an inset 428 showing the drive panel 104, the first follower panel 108*a-b*, and the second follower panel 112*a-b*. In this example, upon translation of the drive panel 104, the first follower panel 108*a-b* is translated due to the coupling of first latch 408*a-b* to the drive panel 104. Correspondingly, upon translation of the first follower panel 108*a-b*, the second follower panel 112*a-b* is translated due to the coupling of a second latch 432*a-b* to the first follower panel. The first latch 408*a-b* glides along a first guide channel 436*a-b* (e.g., a guide channel formed along a length of the first guide rail 300) of the rail wall 404*a-b*, and the second latch 432*a-b* glides along a second guide channel 440*a-b* of the rail wall 404*a-b*. When the driver panel 104 translates to a second latch position 444 (e.g., the intermediate or TTL position), a second latch keeper 448*a-b* secures the second latch 432*a-b* by the second latch 432*a-b* rotating a second cam into the second latch keeper 448*a-b*, similar to the first latch 408*a-b* as shown in FIG. 4B. Once latched the second follower panel 112*a-b* stays in place, while the drive panel 104 and the first follower panels 108*a-b* translate upward to the first latch position as described above. Once the driver panel 104 has reached the final position, and is fully extended, the drive panel 104 may be secured into place by a pausing of the actuator and/or the latch/lock mechanism.

When translated from the stored position to an un-stored position (e.g., the intermediate position, TTL position, or final position), The drive panel 104, the first follower panel 108*a-b*, and/or the second drive panel 112*a-b* may be further coupled via a panel to panel coupling mechanism. For example, the drive panel 104, the first follower panel 108*a-b*, and the second follower panel 112*a-b* may be coupled or otherwise stabilized via a dovetail or other type of secure joint.

It should be understood that a portion of the drive panel 104 (e.g., a drive panel portion 452), a portion of the first follower panel 108*a-b* (e.g., a first follower panel portion 456) and/or a portion of the second follower panel 112*a-b* (e.g., a second follower portion 460) may be configured to fit within the guide rail 300, 304 and/or guide channel 436, 440 (e.g., within a guide rail gap 464, preventing the panels 104, 108, 112 from falling out of the guide rail 300, 304. For example, the drive panel portion 452 may include a length of the drive panel 104 that inserts into the guide rail gap 464, as shown in FIG. 4C. In another example, the first follower panel portion 456 may include both the first latch 408*a-b* as well as a length of the first follower panel 108*a-b* that inserts into the guide rail gap, also shown in FIG. 4C.

In another example, the first follower panel portion 456 and/or the second follower panel portion 460 may include only the latch 408, 432 that is disposed within the guide rail gap 462 (e.g., and configured to glide along the first guide channel 436 and the second guide channel 440, respectively.

Figure 5:
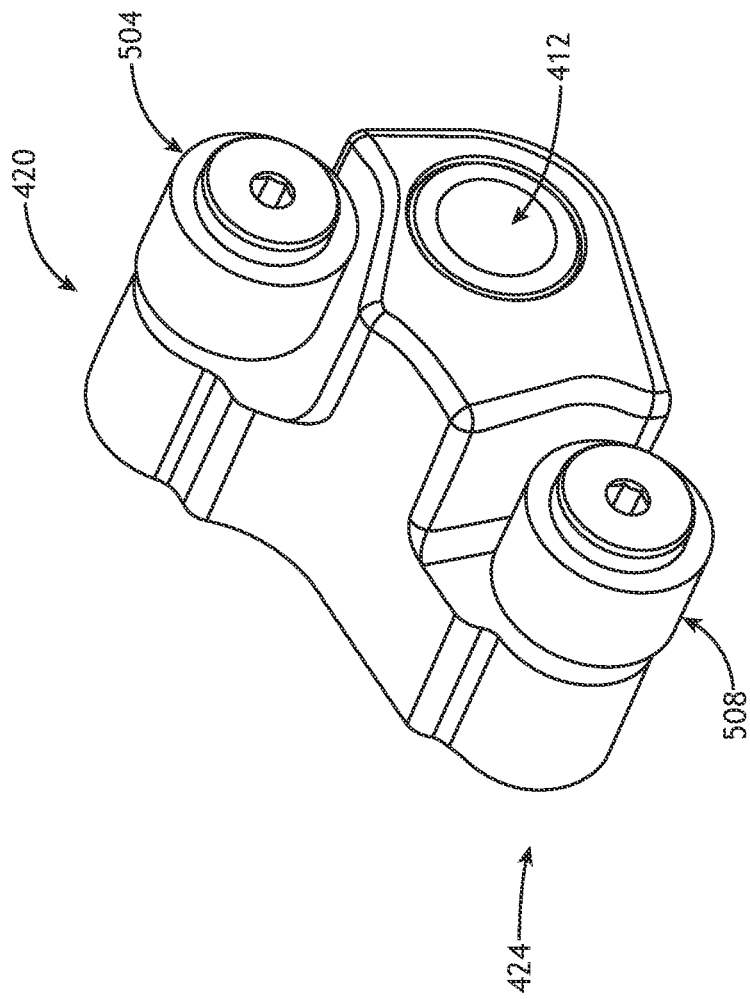
FIG. 5 is a perspective view of a latch, in accordance with one or more embodiments of the disclosure.

FIG. 5 is drawing illustrating the first latch 408*a-b*, in accordance with one or more embodiments of the disclosure. The first latch 408*a-b* may be similar to the second latch 432*a-b*. The first latch 408*a-b* includes the first roller 504 integrated into the first cam 420 and a second roller 508 integrated into the second cam 424. The first roller is configured to roll up against the rail wall 404 until the first latch 408*a-b* rotates upon reaching the first latch position 318, and the first cam 420 rotates the first roller 504 into the first latch keeper 416. At that point the second roller 508 is rotated into position between the rail wall 404 and the drive panel 104. The second roller 508 then rotates when the drive panel 104 is extended further, reducing friction and assisting the translation of the drive panel 104 from the first latch position to the final position.

Different shapes of latches or different designs may be used to secure the first follower panel 108*a-b* and the second follower panel 112*a-b* into, and out of, the first latch keeper 416*a-b* and the second latch keeper 448*a-b*, respectively. For example, the first latch 408*a-b* may include a reduced friction coating that adds to, or replaces, the first roller 504 and/or second roller 508. In another example, the rotation of the first latch 408*a-b* or the second latch 432*a-b* may be biased via a spring. Therefore, the above description should not be interpreted as a limitation of the present disclosure, but merely as an illustration.

As shown in FIG. 4C, the driver panel 104, the first follower panels 108*a-b*, and the second follower panels 112*a-b* are substantially superposed, lying flat against each other, when in the stored position. However, in some embodiments, the driver panel 104, the first follower panels 108*a-b*, and the second follower panels 112*a-b* are not exactly superposed. For example, due to the arrangements of the latches 408, 432, the driver panel 104 may be arranged slightly higher than the first follower panel 108*a-b* when in the stored position. The first follower panel 108*a-b* may be correspondingly arranged at a higher position than the second follower panel 112*a-b*.

Figure 6:
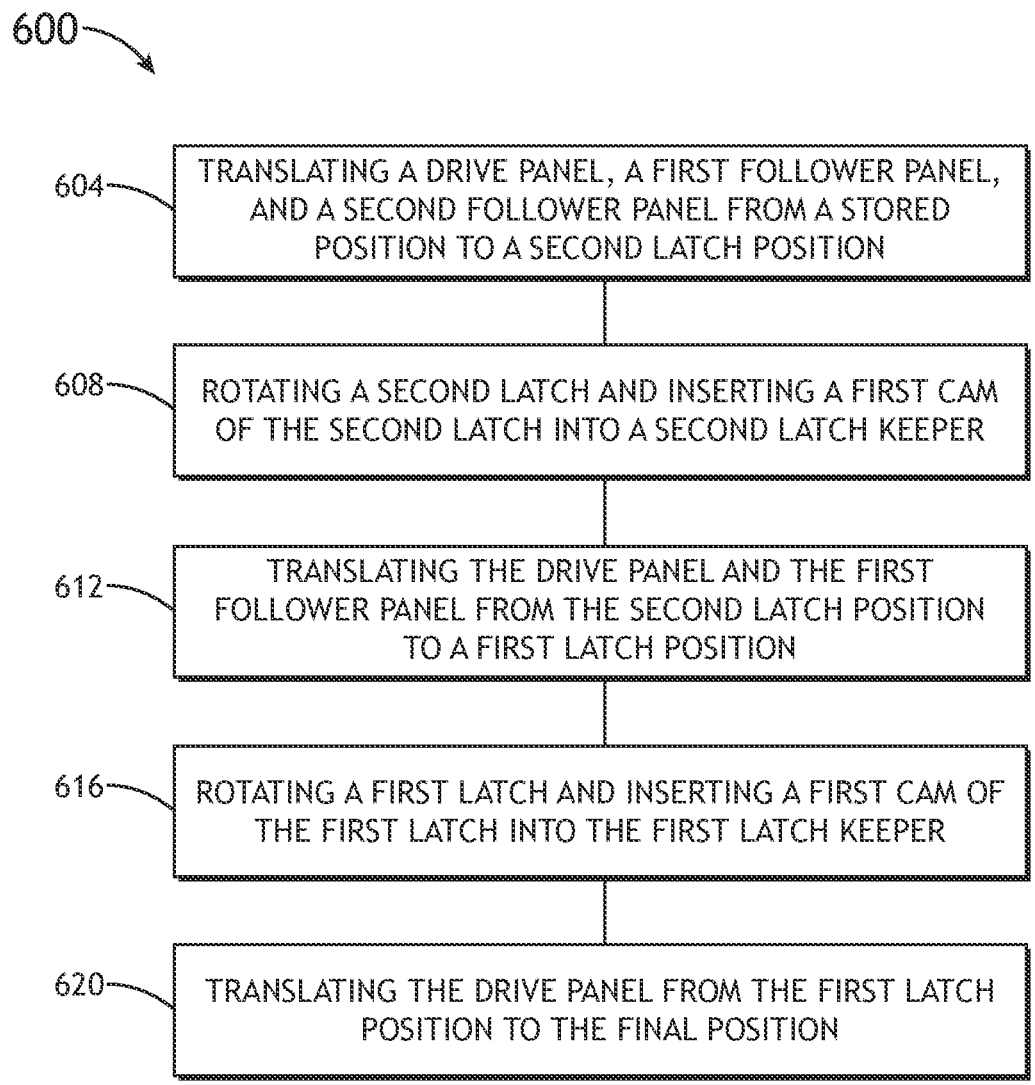
FIG. 6 is a block diagram illustrating a method for translating a multi-panel system 100 from the stored position to the final position, in accordance with one or more embodiments of the disclosure.

FIG. 6 is a block diagram illustrating a method 600 for translating a multi-panel system 100 from the stored position to the final position, in accordance with one or more embodiments of the disclosure. The method described the translation of a three-panel system as described in FIGS. 1A-C and 3A-C.

In embodiments, the method 600 includes a step 604 of translating the drive panel 104, the first follower panel 108*a-b*, and the second follower panel 112*a-b* from the stored position to the second latch position 444 (e.g., the second latch position inferior to the first latch position). The second latch position 444, is the site of the second latch keeper 448*a-b*, which is lined up with the second latch 432*a-b* at the second latch position 444. The force driving the drive panel 104, the first follower panel 108*a-b*, and the second follower panel 112*a-b* is the actuator 204 that is operatively coupled to the drive panel 104 via the connector 320.

In embodiments, the method 600 further includes a step 608 of rotating the second latch 432*a-b* and inserting the first cam 420 of the second latch 432*a-b* into the second latch keeper 448*a-b*. Once the second latch 432*a-b* has rotated, the second cam 424 of the second latch 432*a-b* moves away from the first follower panel 108a-b, allowing the drive panel and the first follower panel 108 to continue translating toward the final position/

In embodiments, the method 600 further includes a step 612 of translating the drive panel 104 and the first follower panel 108a-b from the second latch position 444 to the first latch position 418. Similar to step 604, the first latch position 418, is the site of the first latch keeper 448a-b, which is lined up with the first latch 408a-b at the first latch position 418.

In embodiments, the method 600 further includes a step 616 of rotating the first latch 408a-b and inserting the first cam 420 of the second latch 408a-b into the first latch keeper 416a-b. Similar to step 608, once the first latch 408a-b has rotated, the second cam 424 of the first latch 408a-b moves away from the drive panel 104, allowing the drive panel to continue translating toward the final position. The method 600 further includes a step 620 of translating the drive panel 104 from the first latch position 418 to the final position. Once in the final position, the driver panel 104, the first follower panel 108a-b, and the second follower panel 112a-b can be reversibly translated back to the stored position, in a manner essentially reversed form the method 600.

In embodiments, the multi-panel system 100 may be configured as a privacy screen (e.g., when fully extended to the final position). In embodiments, the privacy screen is implemented between two seats 90,94, such between two aircraft seats. In embodiments, the multi-panel system 100 may include the two seats 90,94. These seats may be configured to lay flat, such as into bed mode. In embodiments, the drive panel 104 is translated to, or below, a seat pans of the seat (e.g., the bed when the seat 94, 98 is in bed mode) when the drive panel 104 is translated to the stored position. For example, a top, or top portion, of the drive panel 108 may be disposed at or below the surface of at least one seat pan of the seats 94 98 when the drive panel 104 is configured in the stored position. This allows one or more people to use the bed space created by the laying-flat of the seats 94, 98, without being constrained by the privacy screen.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to, one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A multi-panel system comprising:
a guide rail comprising:
a guide channel formed along a length of the guide rail; and
a rail wall comprising a first latch keeper;
a drive panel configured to translate along the guide rail from a stored position to a final position, comprising:
a drive panel portion configured to fit within the guide channel; and
an actuation point configured to couple to an actuator; and
a first follower panel configured to translate along the guide rail and further configured to translate from the stored position, substantially superposed relative to the drive panel, to a first latch position, comprising:
a first surface; and
a first latch rotatably coupled to the first surface configured to couple the first follower panel to the drive panel when the drive panel is translated from the stored position, couple to the first latch keeper when the first follower panel has translated to the first latch position, and uncouple the first follower panel from the drive panel when the first follower panel has translated to the first latch position, wherein upon translation of the drive panel to the final position, the first follower panel remains in the first latch position and is disposed inferior and parallel to the drive panel.

2. The multi-panel system of claim 1, further comprising:
a second latch keeper disposed inferior to the first latch keeper along the rail wall; and
a second follower panel configured to translate along the guide rail and further configured to translate from the stored position, substantially superposed relative to the first follower panel, to a second latch position, comprising:
a second follower portion configured to fit within the guide channel, and
a second latch operatively coupled to the second follower portion, the second latch configured to:
couple the second follower panel to the first follower panel when the drive panel is translated from the stored position; and
couple to the second latch keeper when the second follower panel has translated to the second latch position; and
uncouple the second follower panel from the first follower panel when the second follower panel has translated to the second latch position, wherein upon translation of the first follower panel to the first latch position, the second follower panel remains in the second latch position and is disposed inferior and parallel to the first follower panel.

3. The multi-panel system of claim 2, further comprising an armrest coupled to at least one of the drive panel, the first follower panel, or the second follower panel.

4. The multi-panel system of claim 1, further comprising a second guide rail configured to interact with the drive panel on a second end opposite a first end.

5. The multi-panel system of claim 1, wherein the first latch is configured as a cam latch comprising a first cam configured to rotate into the first latch keeper via a cam bearing.

6. The multi-panel system of claim 1, wherein a first cam comprises a first roller configured to roll against the rail wall while the first follower panel translates from the stored position toward the first latch position.

7. The multi-panel system of claim 1, wherein the first latch further comprises a second cam that includes a second roller, wherein the second cam prevents the drive panel from translating past the first follower panel when the drive panel translates from the stored position toward the first latch position, wherein the second roller assists the translation of the drive panel from the first latch position to the final position.

8. The multi-panel system of claim 1, further comprising the actuator.

9. The multi-panel system of claim 1, wherein the actuator is configured as a linear screw actuator.

10. The multi-panel system of claim 1, further comprising a controller operatively coupled to the actuator, wherein the controller is configured to control the actuator via input from a first user interface.

11. The multi-panel system of claim 10, further comprising a second user interface, wherein the second user interface is configured to override a function of the first user interface.

12. The multi-panel system of claim 1, wherein the multi-panel system comprises a pair of the guide rails, and a pair of first follower panels, wherein a translation of the drive panel from the stored position to the final position causes an equivalent translation between the pair of the first follower panels.

13. The multi-panel system of claim 1, wherein upon a translation of the drive panel translating to the final position, the drive panel and the first follower panel are further coupled via a dovetail joint.

14. The multi-panel system of claim 1, wherein translating the drive panel to the final position forms a privacy screen.

15. The multi-panel system of claim 14, wherein the privacy screen is implemented between two seats.

16. The multi-panel system of claim 15, further comprising the two seats.

17. The multi-panel system of claim 16, wherein a top of the drive panel is disposed at or below the surface of at least one seat pan of the two seats when the drive panel is configured in the stored position.

18. The multi-panel system of claim 15, wherein the two seats are configured to recline to a flat position.

19. The multi-panel system of claim 15, wherein the multi-panel system is further implemented on-board an aircraft.

20. The multi-panel system of claim 1, further comprising an armrest coupled to at least one of the drive panel or the first follower panel.

* * * * *